United States Patent [19]
Schiller et al.

[11] 3,901,844

[45] Aug. 26, 1975

[54] POLYCARBONATE PLASTICS HAVING IMPROVED TRACKING RESISTANCE

[75] Inventors: Paul Schiller, Krefeld-Uerdingen; Josef Merten, Korschenbroich; Hugo Vernaleken, Krefeld-Bockum, all of Germany

[73] Assignee: Bayer Aktiengesellschaft, Germany

[22] Filed: Mar. 28, 1974

[21] Appl. No.: 455,843

[30] Foreign Application Priority Data
Mar. 30, 1973 Germany............................ 2315887

[52] U.S. Cl........ 260/37 PC; 117/232; 260/45.75 F; 260/45.75 G
[51] Int. Cl.²......................................... C08G 51/04
[58] Field of Search .. 260/45.75 G, 45.75 F, 37 PC, 260/47 XA; 117/232

[56] References Cited
UNITED STATES PATENTS

| | | | |
|---|---|---|---|
| 3,577,346 | 5/1971 | McKeown | 260/45.75 |
| 3,627,554 | 12/1971 | Bockmann et al. | 260/37 |
| 3,755,244 | 8/1973 | Hart | 260/37 |
| 3,761,440 | 9/1973 | Margotte et al. | 260/37 |

OTHER PUBLICATIONS

Polycarbonates – by Christopher and Fox; 1962; pp. 151 and 152.

*Primary Examiner*—V. P. Hoke
*Attorney, Agent, or Firm*—Lawrence S. Pope

[57] ABSTRACT

The resistance to tracking paths for electric currents of polycarbonate plastics is improved by dispersing from about 10 to about 50% by weight of a hydrophobic $TiO_2$ or $Cr_2O_3$ therein. The polycarbonate composition may be used for making components which are associated with electrical conductors.

6 Claims, No Drawings

POLYCARBONATE PLASTICS HAVING IMPROVED TRACKING RESISTANCE

This invention relates generally to polycarbonate plastics and more particularly to polycarbonates which are based on dihydroxydiaryl compounds which have improved electrical tracking resistance and are suitable for molding parts which provide electrical insulation.

The electrical tracking resistance of thermoplastics is constantly becoming of greater importance because thermoplastics more and more frequently carry live electrical components or are in contact with such components. As a result of surface deposits of dust and moisture, tracking paths can form and tracking currents or leakage current can flow which ultimately, in the case of materials which are not resistant to tracking, lead to disruptive discharge and, under certain circumstances, to a fire. It is therefore important that plastics which have low or inadequate electrical tracking resistance should be modified so as to become resistant to tracking.

It is known that the electrical tracking resistance of plastics which are predominantly or exclusively built up of aromatic compounds, such as polystyrene and polysulphones, is unsatisfactory. The polycarbonates based on dihydroxyaryl compounds, especially the polycarbonate from bis-2-(4-hydroxyphenyl)-propane (Bisphenol A) also have poor tracking properties. The electrical tracking resistance of a polycarbonate prepared from Bisphenol A, for example, measured according to the currently customary KB process according to VDE (Verband Deutscher Elektrotechniker, i.e. Association of German Electrical Engineers) 0303, part 1, of Sept. 1964 is approximately $260 \pm 20$ volts with test solution F and $140 \pm 20$ volts with test solution A. (Test Solution F is an 0.1 % strength aqueous $NH_4Cl$ solution and test solution A is solution F with 0.5 % by weight of wetting agent). Polycarbonates have thermal and mechanical properties which adapt them for use in electrical appliances and for electrical insulation but they have not been widely accepted for such purposes because of their poor electrical tracking resistance or resistance to leakage current.

It is therefore an object of this invention to provide a polycarbonate polymer which is devoid of the foregoing disadvantage. Another object of the invention is to provide a polycarbonate composition adapted to be molded to form components associated with electrical conductors. Still another object of the invention is to provide a process for improving the electrical tracking resistance of a polycarbonate plastic.

The foregoing objects and others are accomplished in accordance with this invention, generally speaking, by providing a thermoplastic polycarbonate containing sufficient inert hydrophobic $TiO_2$ or $Cr_2O_3$ dispersed therein to improve its resistance to electrical tracking. It has now been found, surprisingly, that the electrical tracking resistance of polycarbonate based on bishydroxyaryl compounds can be improved substantially by the addition of major amounts of inert hydrohobic $TiO_2$ or $Cr_2O_3$.

Hence, the invention provides compositions of high molecular weight, thermoplastic, aromatic polycarbonates based on bis-hydroxyaryl compounds which are suitable for the manufacture of moldings of improved electrical tracking resistance for electrical insulation. The improved polycarbonate compositions contain from about 10 per cent to about 50 per cent by weight, preferably about 15 to about 30 per cent by weight based on the total weight of the composition, of inert hydrohobic $TiO_2$ or $Cr_2O_3$.

Pigmented polycarbonates are known and are commercially available products. The pigment content of such polycarbonates, however, is normally only about 0.5 % by weight. The electrical tracking resistance of these products is not measurably improved compared to unpigmented material and in the case of $Cr_2O_3$ is even distinctly worse.

Furthermore, commercial products containing 20 or 30 % by weight of glass fibers are known. Their electrical tracking resistance is also only slightly improved, to $160 \pm 20$ volts, in spite of the high proportion of filler or glass fibers. It has now been found that, contrary to what would be expected from such experience, that additions of the known hydrophobic inert pigments $TiO_2$ or $Cr_2O_3$ in amounts of 10 to 50 % by weight significantly improve the electrical tracking resistance of the polycarbonate.

The pigments $TiO_2$ and $Cr_2O_3$ useful in the present invention, have particle sizes between $0.1\mu$ and $100\mu$, preferable between $0.1\mu$ and $10\mu$. The pigments $TiO_2$ or $Cr_2O_3$ can, if they are not already hydrophobic, be rendered hydrophobic, this being achieved in a known manner, for example, by covering the surface of the $TiO_2$ or $Cr_2O_3$ with hydrophobic plastics such as polysiloxanes or with longchain fatty acids.

The electrical tracking properties of any high molecular weight, thermoplastic aromatic polycarbonate can be improved in accordance with this invention. For example, polycarbonates having molecular weights between 10,000 and 100,000 and being prepared by reacting phosgene or a diester of carbonic acid with a bishydroxy aromatic compound such as hydroquinone, resorcinol, 4,4'-dihydroxydiphenyl, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides or bis-(hydroxyphenyl)-sulphones $\alpha,\alpha'$-bis-(hydroxyphenyl)-diisopropylbenzene and the corresponding nuclear-alkylated or nuclear-halogenated compounds may be used in practicing the invention. Preferred polycarbonates are those based on 4,4'-dihydroxydiphenylpropane-2,2 (Bisphenol A), tetrachlorobisphenol A, tetrabromobisphenol A, tetramethylbisphenol A and trinuclear bisphenols, such as $\alpha,\alpha'$-bis-(4-hydroxyphenyl)-p-diisopropylbenzene.

Additional bisphenols suitable for the manufacture of polycarbonates to be improved in accordance with this invention are described in U.S. Pat. Nos. 3,028,365; 2,999,835; 3,148,172; 3,271,368; 2,970,137; 2,991,273; 3,271,367; 3,280,078; 3,014,891 and 2,999,846 the disclosures of which are incorporated herein by reference.

Any suitable process can be followed in dispersing the $TiO_2$ or $Cr_2O_3$ in the polycarbonate such as, for example, the following processes:

1. By addition of the filler or of the pigment — if appropriate as a masterbatch — to a polycarbonate melt.

2. By incorporation of the filler while dispersed in an inert solvent in the polycarbonate and removal of the solvent by evaporation or the like.

The polycarbonates provided by the invention may be employed in the electrical field, especially for the manufacture of parts carrying live electrical conducors such as circuit components, electrical outlet plugs, terminal bars and the like, where good mechanical properties and above all good thermal properties are required.

The examples which follow illustrate the improvement of the tracking resistance of polycarbonates provided by the invention.

EXAMPLE 1

A polycarbonate plastic based on bis-2-(4-hydroxyphenyl)propane (Bisphenol A) manufactured by the phase boundary condensation process in which phosgene is reacted with the Bisphenol A, and having a relative viscosity of $\eta_{rel} = 1.280$ is mixed with various amounts of $TiO_2$ (rutile type, Bayer Titan RKB) or $Cr_2O_3$ in the melt and the mixture is injection molded to form small slabs of 50 mm × 40 mm × 5 mm dimensions. The electrical tracking resistance of each of the slabs is then measured by means of the KB process VDE 0303, part 1, of September 1964); the values found for the various mixtures are summarized in Tables I and II.

TABLE I

| Polycarbonate parts by weight | $TiO_2$ parts by weight | Tracking resistance KB(A) [volt] |
|---|---|---|
| 100 | — | 120–140 |
| 99.5 | 0.5 | 120–140 |
| 90 | 10 | 180 |
| 80 | 20 | 220 |
| 70 | 30 | 260 |

Table II

| Polycarbonate parts by weight | $Cr_2O_3$ parts by weight | Tracking resistance KB(F) [volt] |
|---|---|---|
| 100 | — | 260 ±20 volt |
| 99.5 | 0.5 | 200 volt |
| 95 | 5 | 280 volt |
| 90 | 10 | 340 volt |
| 80 | 20 | 440 volt |
| 70 | 30 | 480 volt |

Likewise, the tracking resistance of any of the polycarbonates contemplated herein can be improved in accordance with the process of the above examples.

Although the invention has been described in detail for the purpose of illustration, it is to be understood that such detail is solely for that purpose and the variations can be made therein by those skilled in the art without departing from the spirit or scope of the invention except as it may be limited by the claims.

What is claimed is:

1. A high molecular weight, thermoplastic, aromatic polycarbonate composition adapted for the manufacture of moldings for electrical insulation which are electrical resistant to tracking, said polycarbonate composition comprising from about 10 to about 50 per cent by weight, based on the total weight of the composition, of hydrophobic $TiO_2$ or $Cr_2O_3$ which are inert towards the polycarbonate.

2. A molded polycarbonate plastic containing from about 10 to about 50 per cent by weight of hydrohobic inert $TiO_2$ or $Cr_2O_3$ which are resistant to the tracking of an electrical current.

3. A method for improving the resistance of a polycarbonate plastic composition which comprises dispersing from about 10 to about 50 percent by weight of hydrophobic inert $TiO_2$ or $Cr_2O_3$ in the said composition.

4. An electrical insulator comprising a polycarbonate plastic containing from about 10 to about 50 percent by weight of hydrophobic inert $TiO_2$ or $Cr_2O_3$.

5. The polycarbonate of claim 1 wherein the oxide additive has a particle size of from about 0.1 to about 100 microns.

6. The polycarbonate of claim 1 wherein the oxide additive has a particle size of from about 0.1 to about 10 microns.

* * * * *